United States Patent Office 3,300,487
Patented Jan. 24, 1967

3,300,487
OXAZEPINE DERIVATIVE OF 12β-AMINO-5α-PREGNANE-3β·20β-DIOL
Kanzo Sasaki, Osaka-shi, and Junichi Kawanami, Toyonaka-shi, Japan, assignors to Shionogi & Co., Ltd., Osaka, Japan
No Drawing. Filed Oct. 11, 1965, Ser. No. 494,925
1 Claim. (Cl. 260—239.55)

This application is a continuation-in-part of copending application, Serial No. 273,319, filed April 16, 1963, now abandoned.

The present invention relates to 12-alkylaminosteroids and production thereof. More particularly, it relates to the 3,20-dihydroxy-12-mono or dialkylaminopregnane represented by either of the following formulae:

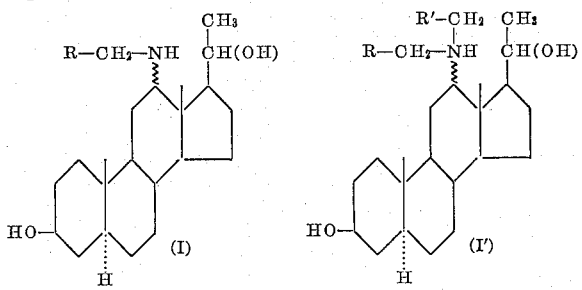

wherein R and R' each represents a hydrogen atom or a lower alkyl group (e.g. methyl, ethyl, propyl, butyl) and the ripple mark (⸟) is a generic indication of both α- and β-configurations and production thereof.

According to the process of the present invention, the said 12-alkylaminosteroid of Formula I or I' is prepared by alkylating the 3,20 - dihydroxy - 12 - aminopregnane represented by the following formula:

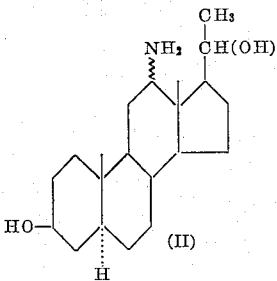

wherein the ripple mark (⸟) is a generic indication of both α- and β-configurations.

The starting 12-aminosteroid of Formula II can be prepared from the corresponding 12-oxosteroid, i.e. 3,20-dihydroxy-12-oxopregnane [e.g. Julian et al.: U.S. Patent 2,940,991; Kirk et al.: J. Chem. Soc., page 1046 (1957); Wall et al.: J. Org. Chem., vol. 26, page 159 (1961); Just et al.: Can. J. Chem., vol. 39, pages 548 and 1274 (1961)] by subjecting the latter to oximation (oxime-formation), followed by reduction of the resultant 12-hydroxyiminosteroid. The concrete procedure for these conversions has been described in detail in copending application Ser. No. 196,472 of H. Mitsuhashi, filed May 21, 1962, now U.S. Patent No. 3,113,330.

The alkylation may be accomplished by various conventional methods. For instance, the starting 12-aminosteroid (II) is treated with an alkylating agent such as lower alkyl halide (e.g. methyl chloride, methyl bromide, methyl iodide, ethyl chloride), di(lower)alkyl sulfate (e.g. dimethyl sulfate, diethyl sulfate) and diazomethane under the reaction conditions which are usually adopted on the use of the said alkylating agent to give the objective 12-alkylaminosteroid (I or I') by one step. On this alkylation method, there is generally produced a mixture of the 12-monoalkylaminosteroid (I) and the 12-dialkylaminosteroid (I'). However, each of them can be readily isolated from the mixture by a conventional separation procedure (e.g. recrystallization, chromatography). Further, for instance, the alkylation can be performed by subjecting the 12-aminosteroid (II) to Leuckart reaction, i.e. the treatment with a mixture of formic acid and a carbonyl compound such as lower alkanal (e.g. formaldehyde, acetaldehyde, propionaldehyde) and lower alkanone (e.g. acetone, diethyl ketone) while heating, whereby the objective 12-alkylaminosteroid (I or I') is yielded. Alternatively, the same object may be attained by two steps, for instance, acylation of the 12-aminosteroid (II) and reduction of the resulting 12-monoacylaminosteroid which is represented by the following formula:

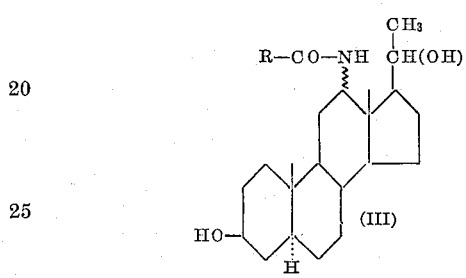

wherein R has the same significance as designated above and the ripple mark (⸟) is a generic indication of both α- and β-configurations. The acylation is carried out, for instance, by treating the 12-aminosteroid (II) with a conventional acylating agent such as lower alkyl formate (e.g. methyl formate, ethyl formate) and lower alkanoic anhydride (e.g. acetic anhydride, propionic anhydride, butyric anhydride) at a temperature from room temperature (15 to 30° C.) to reflux temperature, if necessary, in an inert organic solvent (e.g. benzene, toluene, dichloromethane, chloroform, pyridine, picoline). The subsequent reduction is executed, for instance, by treating the resulting 12-monoacylaminosteroid of Formula III with metallic hydride complex (e.g. lithium aluminum hydride, sodium borohydride) in an inert organic solvent (e.g. ether, tetrahydrofuran, dioxane) at a temperature from room temperature (15 to 30° C.) to reflux temperature. On the above acylation, there may be produced the 12-monoacylaminosteroid (III) wherein the hydroxyl group(s) at the 3- and/or 20-position(s) is also acylated which, however, can be likewise subjected to the said reduction. By this two-steps-method, there is prepared the 12-monoalkyl-aminosteroid (I). Whenever the 12-monoalkylaminosteroid (I) is obtained as a product in any method as stated above (i.e. one-step-method and two-steps-method), it may be again subjection to alkylation in the same manner to obtain the 12-dialkylaminosteroid (I').

The thus-obtained 12-alkylaminosteroid (I or I') possesses anti-progestational and anti-decidumatogenic activities both which are stronger than that are shown in the starting 12-aminosteroid (II). In the test using rabbits, for instance, 3β,20β-dihydroxy-12β-methylamino-5α-pregnane (1), 3β,20β-dihydroxy-12β-ethylamino-5α-pregnane (2) and 3β,20β-dihydroxy-12α-dimethylamino-5α-pregnane (3) respectively exhibited significant inhibition of progestational response induced by subcutaneous injection of each 4 milligrams of progesterone, when administered at the dose level of 1–1.5 milligrams per horn by intrauterine injection. Furthermore, it was confirmed that the 12-alkylaminosteroid (I or I') of the invention possesses no sodium retaining activity, whereas the starting 12-aminosteroid (II) exhibited significantly potent this side-effect. For instance, the compounds (1), (2) and (3) respectively exhibited no response on urinary sodium- and potassium-excretion and their ratio by subcutaneous injection in rats at the dose level of 5 mg. The following Table I shows the results obtained from 4 hours urine.

TABLE I

| Compd. | No. of rats | Urine volume [1] | Na-excretion [2] | K-excretion [2] | Na/K-ratio |
|---|---|---|---|---|---|
| | 12 | 2.00±0.13 | 216.8±18.5 | 23.6±1.6 | 9.50±0.73 |
| DOCA (20 μg.) | 13 | 1.16±0.16 | 57.2± 9.4 | 56.9±5.8 | 1.17±0.18 |
| (1) | 8 | 1.66±0.14 | 200.9±15.5 | 29.2±3.9 | 8.21±1.71 |
| (2) | 8 | 1.78±0.16 | 201.8±16.5 | 22.9±3.3 | 8.90±1.56 |
| (3) | 8 | 1.59±0.15 | 198.5±14.8 | 24.6±4.1 | 8.35±1.88 |

[1] Ml./100 g. of body weight.
[2] Milli-equivalent×1,000 per 100 g. of body weight.

On the contrary, the starting 12-aminosteroid, e.g. 3β,20β-dihydroxy-12β-amino-5α-pregnane (4) and 3β-20β-dihydroxy-12α-amino-5α-pregnane (5) respectively exhibited significant mineral-excretion by the same experiment as shown in the following Table II.

TABLE II

| Compd. | No. of rats | Urine volume [1] | Na-excretion [2] | K-excretion [2] | Na/K-ratio |
|---|---|---|---|---|---|
| | 11 | 1.76±0.22 | 2.19±0.53 | 1.32±0.27 | 1.90±0.32 |
| DOCA (10 μg.) | 8 | 1.37±0.29 | 1.06±0.43 | 1.56±0.38 | 0.01±0.36 |
| (4) | 4 | 0.58±0.21 | 0.70±0.35 | 0.51±0.15 | 1.35±0.44 |
| (5) | 4 | 0.68±0.23 | 0.77±0.35 | 0.78±0.28 | 1.04±0.43 |

[1] Ml./100 g. of body weight.
[2] Mg./100 g. of body weight.

Thus, the 12-alkylaminosteroid of the invention may be useful as selective hormonal agent such as anti-progestin or anti-fertility agent.

Practical and presently-preferred embodiments of the present invention are illustratively shown in the following examples. The abbreviations have the following significances: mg., milligram(s); g., gram(s); ml., millilitre(s); Anal. Calcd., analysis calculated; and °C., degrees centigrade. Other abbreviations have conventional significances.

*Example 1*

A solution of 3β,20β-dihydroxy-12α-amino-5α-pregnane (380 mg.) in ethyl formate (30 ml.) is heated for 15 hours at 100° C. in an autoclave. After removal of the substance boiling at a lower temperature under reduced pressure, the residue is crystallized from ethyl acetate to give 3β,20β-dihydroxy-12α-formylamino-5α-pregnane (320 mg.) as crystals melting at 254 to 266° C. $[\alpha]_D^{22.5}+52\pm2°$ (methanol).

IR: $\nu_{max.}^{Nujol}$ 1660, 1640, 1550 cm.$^{-1}$

*Analysis.*—Calcd. for $C_{22}H_{37}O_3N$: C, 72.68; H, 10.26; N, 3.83. Found: C, 72.35; H, 10.42; N, 3.84.

A solution of 3β,20β-dihydroxy-12α-formylamino-5α-pregnane (200 ml.) in tetrahydrofuran (30 ml.) is added to a suspension of lithium aluminum hydride (300 mg.) in ether (20 ml.), and the resultant mixture is refluxed for 4 hours. After decomposition of excess of the reducing agent with water, the solvent is removed under reduced pressure. The residue is combined with water and shaken with chloroform. The chloroform extract is washed with water, dried and the solvent evaporated to an oil (210 mg.). The oil is crystallized from a mixture of ether and petroleum ether to give 3β,20β-dihydroxy-12α-methylamino-5α-pregnane (138 mg.) as crystals melting at 176 to 178° C. $[\alpha]_D^{24}+48\pm2°$ (methanol).

IR: $\nu_{max.}^{potassium\ bromide}$ 3400, 2800 cm.$^{-1}$

*Analysis.*—Calcd. for $C_{22}H_{39}O_2N$: C, 75.59; H, 11.25; N, 4.01. Found: C, 75.29; H, 11.28; N. 3.71.

The starting material of this example, 3β,20β-dihydroxy-12α-amino-5α-pregnane, is prepared from 3β,20β-dihydroxy-12-oxo-5α-pregnane [Kirk et al.: J. Chem. Soc., page 1046 (1957)] according to the following scheme:

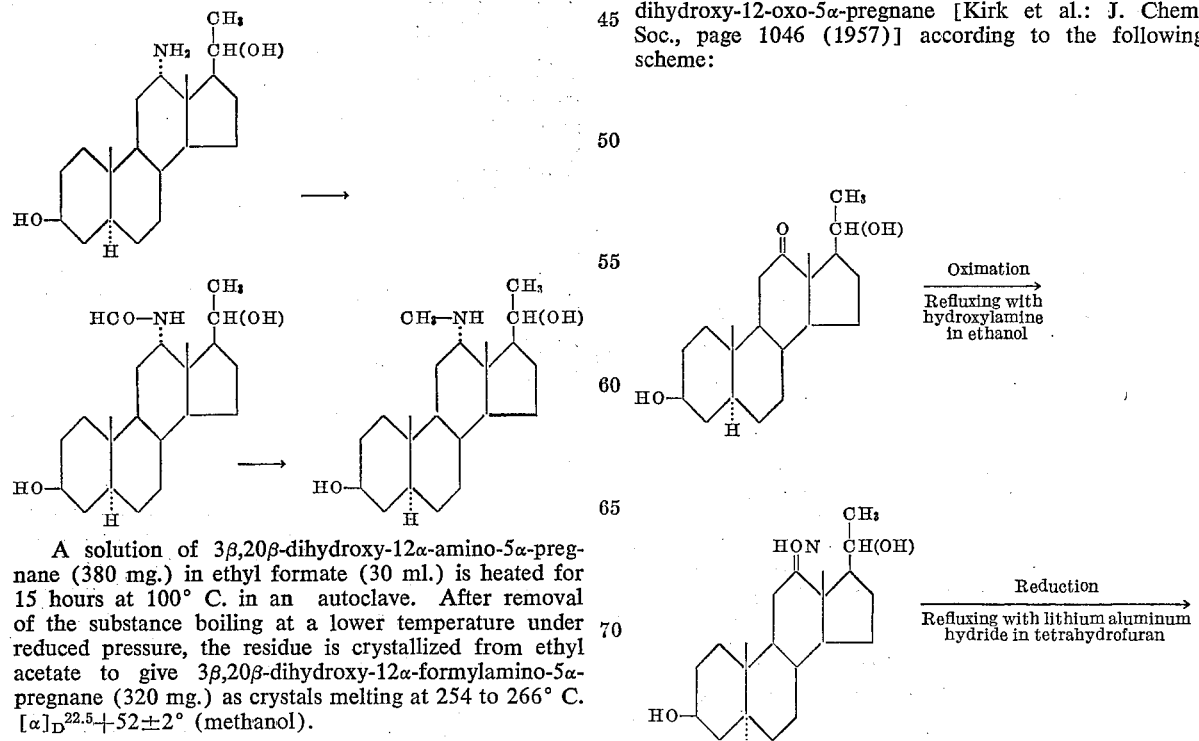

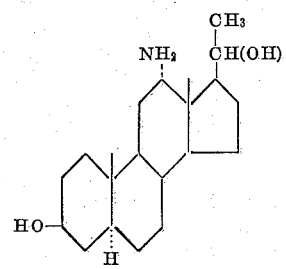

*Example 2*

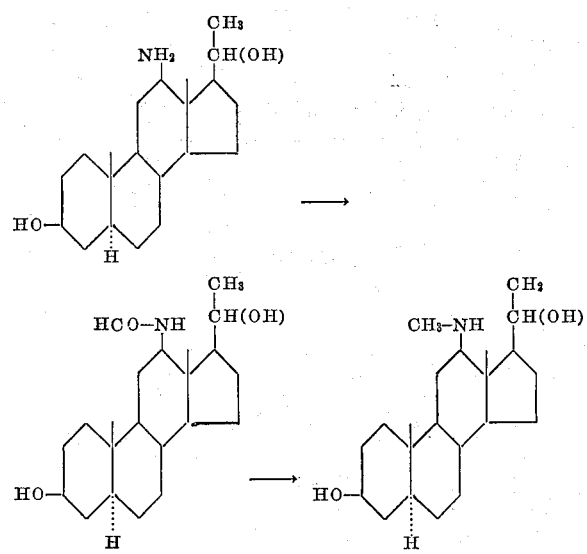

A solution of 3β,20β-dihydroxy-12β-amino-5α-pregnane (1.0 g.) in ethyl formate (35 ml.) is heated for 15 hours at 100° C. in an autoclave. The reaction mixture is filtered to separate the crystallized pillars (620 mg.) The filtrate is condensed and treated with a mixture of methanol and acetone. The precipitated crystals (102 mg.) are collected by filtration, combined with the above separated pillars and recrystallized from a mixture of methanol and acetone to give 3β,20β-dihydroxy-12β-formylamino-5α-pregnane (630 mg.) as crystals melting at 246 to 248° C. The mother liquor from which the crystals were separated above is evaporated and the residue (300 mg.) chromatographed on alumina. The eluate with benzene-chloroform (5:1) is evaporated and crystallized from acetone to give 3β-formyloxy-12β-formylamino-20β-hydroxy-5α-pregnane (70 mg.) as crystals melting at 188 to 189° C.

3β,20β - dihydroxy - 12β - formylamino - 5α-pregnane. $[\alpha]_D^{25}$ —25±2° (methanol).

IR: $\nu_{max}^{Nujol}$ 1668, 1560 cm.$^{-1}$

*Analysis.*—Calcd. for $C_{22}H_{37}O_3N$: C, 72.68; H, 10.26; N, 3.85. Found: C, 72.68; H, 10.39; N, 3.71.

3β - formyloxy-12β-formylamino-20β-hydroxy-5α-pregnane. $[\alpha]_D^{23}$ —20 ±2° (methanol).

IR: $\nu_{max}^{Nujol}$ 1730, 1670, 1535, 1182 cm.$^{-1}$

*Analysis.*—Calcd. for $C_{23}H_{37}O_4N$: C, 70.55; H, 9.35; N, 3.58. Found: C, 70.74; H, 9.68; N, 3.66.

To a suspension of lithium aluminum hydride (200 mg.) in ether (15 ml.), there is dropwise added a solution of 3β,20β-dihydroxy-12β-formylamino-5α-pregnane (50 mg.) in tetrahydrofuran (60 ml.), and the resultant solution is refluxed for 4 hours. After decomposition of excess of the reducing agent with water, the solvent is removed under reduced pressure. The residue is combined with water and shaken with chloroform. The chloroform extract is washed with water, dried and the solvent evaporated. The resulting substance is crystallized from acetone to give 3β,20β-dihydroxy-12β-methylamino-5α-pregnane (83 mg.) as crystals melting at 212.5 to 216° C. $[\alpha]_D^{22.5}$ —17 ±4° (methanol).

IR: $\nu_{max}^{Nujol}$ 3300, 2670 cm.$^{-1}$

*Analysis.*—Calcd. for $C_{22}H_{39}O_2N$: C, 75.59; H, 11.25; N, 4.01. Found: C, 75.79; H, 11.41; N, 4.07.

The starting material of this example, 3β,20β-dihydroxy-12β-amino-5α-pregnane, is prepared from 3β,20β-dihydroxy-12-hydroxyimino-5α-pregnane [cf. Example 1 of this specification] according to the following scheme:

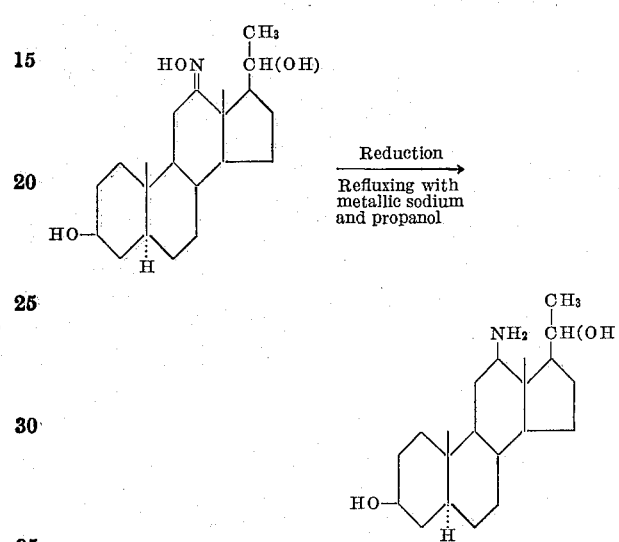

*Example 3*

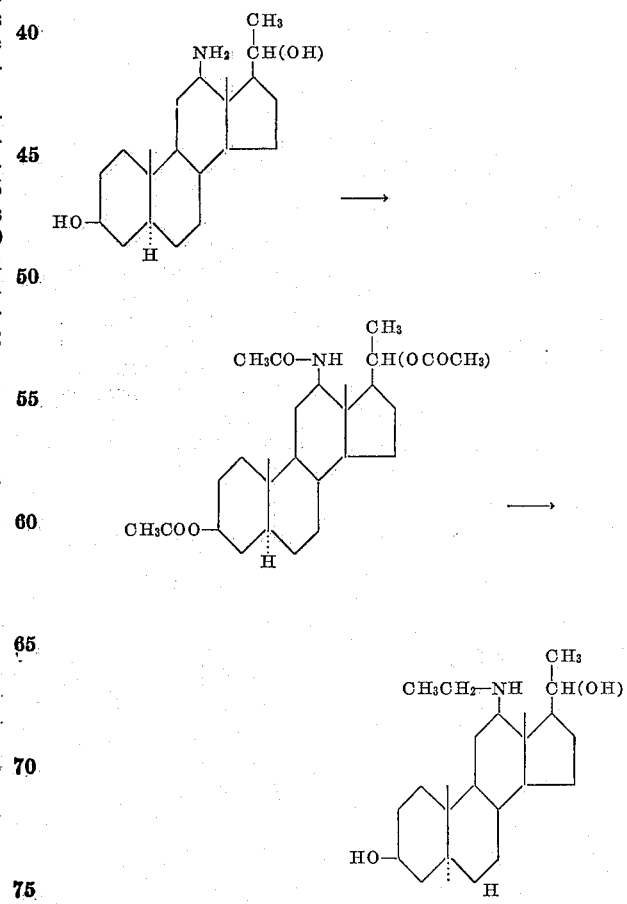

A mixture of 3β,20β-dihydroxy-12β-amino-5α-pregnane (500 mg.) and acetic anhydride (10 ml.) is heated for 1 hour while refluxing. After removal of acetic anhydride under reduced pressure, the residue is combined with water and shaken with ether. The ether extract is chromatographed on alumina for purification whereby there is obtained 3β,20β-diacetyloxy-12β-acetylamino-5α-pregnane (153 mg.) as crystals melting at 211 to 212.5° C. $[\alpha]_D^{26}$ +12 ±4° (chloroform).

IR: $\nu_{max.}^{Nujol}$ 3398, 1721, 1674, 1514, 1269 cm.$^{-1}$

Analysis.—Calcd. for $C_{27}H_{43}O_5N$: C, 70.25; H, 9.39; N, 3.03. Found: C, 70.03; H, 9.47; N, 3.09.

A solution of 3β,20β-diacetyloxy-12β-acetylamino-5α-pregnane (400 mg.) in tetrahydrofuran (8 ml.) is dropwise added to a suspension of lithium aluminum hydride (400 mg.) in ether (8 ml.). The resultant mixture is refluxed for 4 hours. The reaction mixture is combined with water to decompose excess of the reducing agent and shaken with chloroform. The chloroform extract is washed with water, dried and the solvent evaporated. The residue (347 mg.) is crystallized from methanol to give 3β,20β-dihydroxy-12β-ethylamino-5α-pregnane (200 mg.) as crystals melting at 274 to 277° C. $[\alpha]_D^{22}$ —24 ±2° (chloroform).

IR: $\nu_{max.}^{Nujol}$ 3333, 3292, 2687, 2580 cm.$^{-1}$

Analysis.—Calcd. for $C_{23}H_{41}O_2N$: C, 75.98; H, 11.37; N, 3.85. Found: C, 76.19; H, 11.51; N, 3.85.

*Example 4*

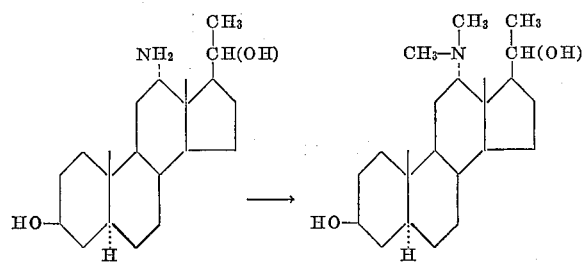

A mixture of 3β,20β-dihydroxy-12α-amino-5α-pregnane (400 mg.), formic acid (10 ml.) and 37% formaldehyde solution (2 ml.) is refluxed for 4 hours in an oil bath (temperature, 130° C.). The reaction mixture is combined with a large amount of water and made to alkalinity with 10% sodium hydroxide. The white precipitate is collected by filtration, washed with water and dried. The resulting substance (450 mg.) is chromatographed on alumina. The eluates with benzene-benzene-chloroform (4:1) are combined together, evaporated and crystallized from acetone to give 3β,20β-dihydroxy-12α-dimethylamino-5α-pregnane (87 mg.) as crystals melting at 184 to 186° C. $[\alpha]_D^{23.5}$ +51 ±2° (chloroform).

IR: $\nu_{max.}^{chloroform}$ 3600, 2790 cm.$^{-1}$

Analysis.—Calcd. for $C_{23}H_{41}O_2N$: C, 75.98; H, 11.37; N, 3.85. Found: C, 75.97; H, 11.42; N, 3.86.

*Example 5*

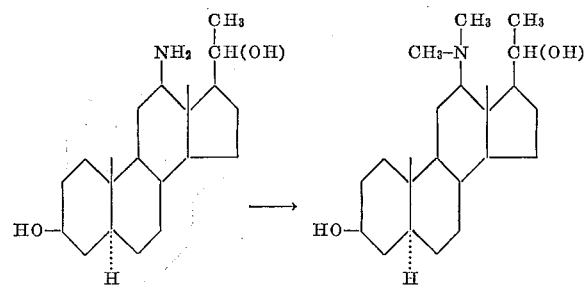

A solution of 3β,20β-dihydroxy-12β-amino-5α-pregnane (300 mg.), methyl iodide (761.5 mg.) and sodium carbonate (568 mg.) in ethanol (3 ml.) is refluxed for 6 hours. The reaction mixture is condensed under reduced pressure, combined with water (30 ml.) and shaken with chloroform. The chloroform extract is washed with water, dried over anhydrous sodium sulfate and the solvent removed. The residue (266 mg.) is chromatographed on alumina. The eluates with petroleum ether-benzene (1:3), petroleum ether-benzene (1:7), benzene and benzene-chloroform (8:1) are combined together, evaporated and crystallized from acetone to give 3β,20β-dihydroxy-12β-dimethylamino-5α-pregnane (130 mg.) as crystals melting at 216 to 223° C. $[\alpha]_D^{22}$ +3.1 ±2° (chloroform).

IR: $\nu_{max.}^{Nujol}$ 3335, 2666, 2565 cm.$^{-1}$

Analysis.—Calcd. for $C_{23}H_{41}O_2N$: C, 75.98; H, 11.37; N, 3.85; O, 8.80. Found: C, 76.03; H, 11.39; N, 3.83 O, 8.79.

*Example 6*

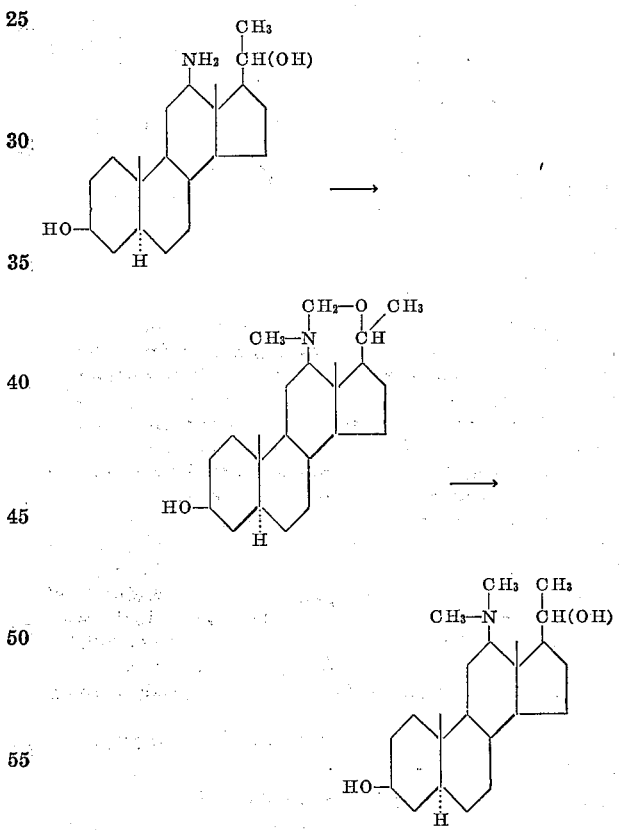

A solution of 3β,20β-dihydroxy-12β-amino-5α-pregnane (500 mg.), formic acid (10 ml.) and 37% formaldehyde solution (2 ml.) is refluxed for 4 hours. The reaction mixture is combined with water and made to alkalinity with 10% sodium hydroxide. The white precipitate is collected by filtration, washed with water and dried. The resulting substance (520 mg.) is crystallized from ether to give an oxazepine derivative (231 mg.) as crystals melting at 165 to 168° C. $[\alpha]_D^{21}$+5.7 (methanol). NMR: 9.17, 8.87, 7.49, 5.55τ.

Analysis.—Calcd. for $C_{23}H_{39}O_2N$: C, 76.40; H, 10.87; N, 3.87. Found: C, 76.27; H, 11.04; N, 3.72.

A solution of the oxazepine derivative (200 mg.) in ether (40 ml.) is dropwise added to a suspension of lithium aluminum hydride (200 mg.) in ether (20 ml.), and the resultant mixture is refluxed for 3 hours. After decomposition of excess of the reducing agent with water, the reaction mixture is filtered. The collected substance is washed with chloroform. The washing chloroform is combined with the filtrate and evaporated under reduced pressure to dryness. The residue is dissolved in chloroform, washed with water, dried over anhydrous sodium sulfate and the solvent evaporated. The resulting substance (230 mg.) is chromatographed on alumina. The eluate with benzene-chloroform (20 10:1) is evaporated and crystallized from acetone to give 3β,20β-dihydroxy-12β-dimethylamino-5α-pregnane (128 mg.) as crystals melting at 216 to 223° C.

It is to be understood that the invention is not to be limited to the exact details of operation or exact compounds shown and described, it being intended to limit the invention only by the scope of the appended claim.

What is claimed is:

A compound represented by the formula:

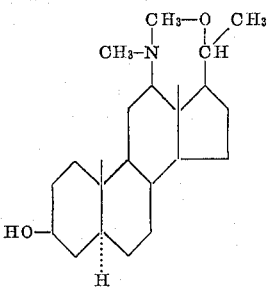

References Cited by the Examiner

UNITED STATES PATENTS 3,113,130   12/1963   Mitsukaski _____ 260—239.55

LEWIS GOTTS, *Primary Examiner.*

E. L. ROBERTS, *Assistant Examiner.*